(12) United States Patent
Lim et al.

(10) Patent No.: US 6,408,104 B1
(45) Date of Patent: Jun. 18, 2002

(54) METHOD AND APPARATUS FOR ELIMINATING NOISE IN A VIDEO SIGNAL ENCODER

(75) Inventors: Kyoung-Won Lim, Seoul; Hee Sub Lee, Kyungki-do; Cheol-Hong Min, Seoul; Sang-Hee Cho, Seoul; Il-Taek Lim, Seoul, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/221,980

(22) Filed: Dec. 29, 1998

(30) Foreign Application Priority Data

Dec. 31, 1997 (KR) ............................................. 97-81037
Dec. 31, 1997 (KR) ............................................. 97-81043

(51) Int. Cl.[7] ................................................ H04B 1/69
(52) U.S. Cl. ....................................... 382/275; 382/274
(58) Field of Search ................................. 382/274–275, 382/270, 260–269; 358/446, 433

(56) References Cited

U.S. PATENT DOCUMENTS 3,815,032 A * 6/1974 Parker et al. ................ 328/167
4,143,325 A * 3/1979 Kahn .......................... 325/478
4,178,100 A * 12/1979 Levis .......................... 356/216
5,754,533 A * 5/1998 Bender et al. ............... 370/252
5,872,810 A * 2/1999 Philips et al. ................ 375/222

FOREIGN PATENT DOCUMENTS

EP 0179530 * 4/1986 ............ H03G/3/32

* cited by examiner

Primary Examiner—Thomas D. Lee
Assistant Examiner—Stephen Brinich
(74) Attorney, Agent, or Firm—Fleshner & Kim, LLP

(57) ABSTRACT

The method and apparatus for eliminating noise in a video signal encoder according to the present invention divides an input video signal into a noise component and a pure video signal component and performs filtering gain control taking account of a rate of energy of the noise and pure signal, thereby performing the exact filtering with respect to an actual noise component and improving picture quality. The present invention also extracts a noise filtered signal component in advance, performs filtering of the remaining signal through gain control, and combines the extracted pure signal component and the filtered remaining signal, thereby eliminating the noise while keeping the resolution of the signal. If the video signal is processed in the unit of blocks, the noise filtering is performed considering this fact, thereby reducing blocking effect and improving picture quality.

23 Claims, 9 Drawing Sheets

$d(i,j,k) = \{f(i,j,k) - f(i-dx, j-dy, k-1)\} + n(i,j,k)$

FIG.8
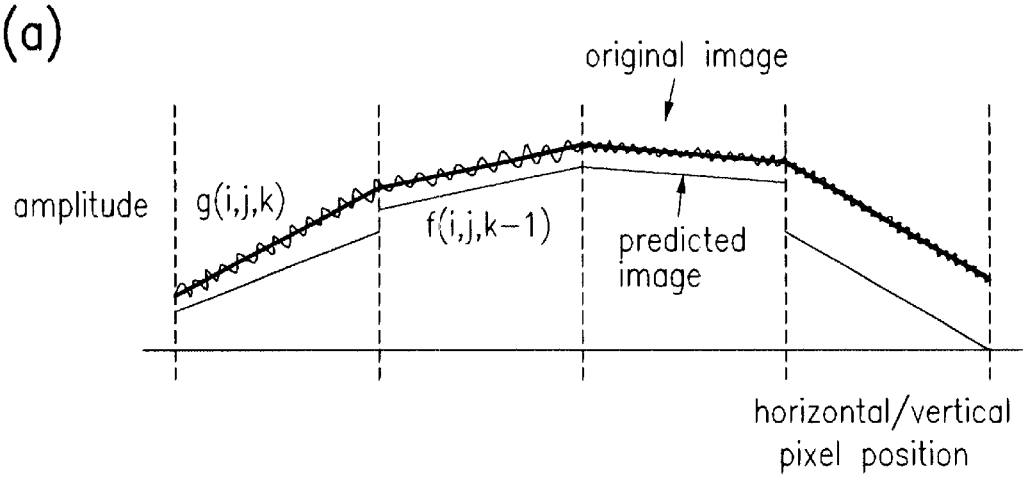
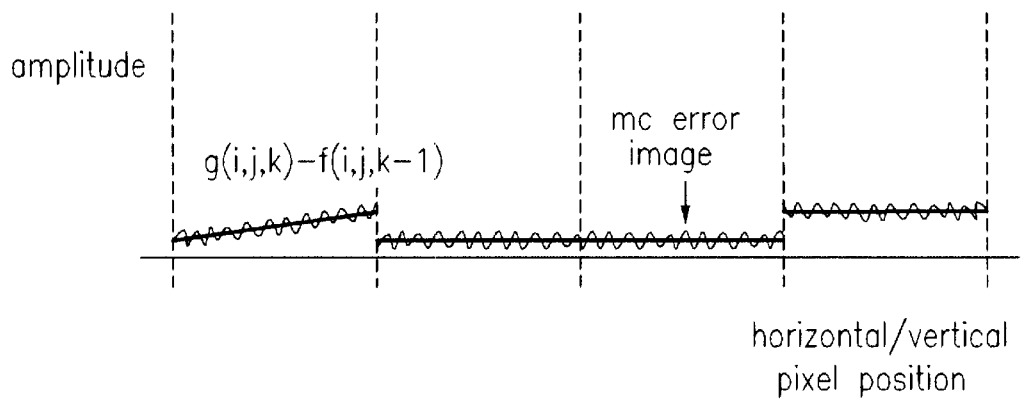
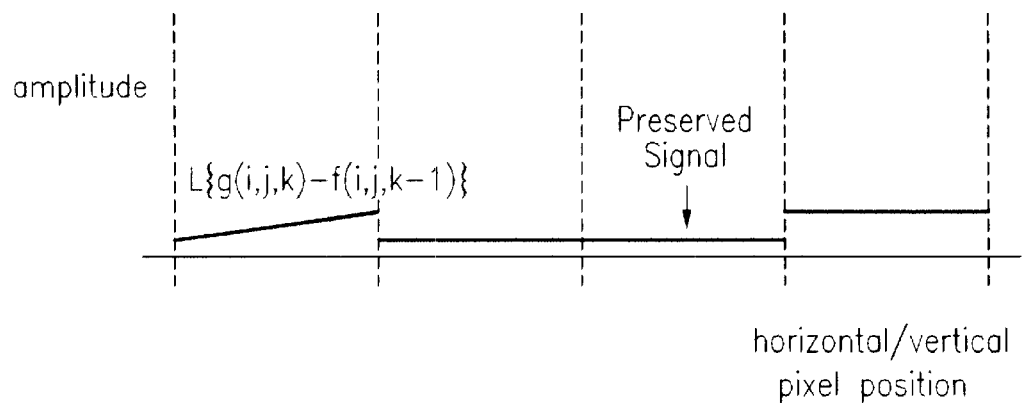

METHOD AND APPARATUS FOR ELIMINATING NOISE IN A VIDEO SIGNAL ENCODER

BACKGROUND OF THE INVENTION

1. Field of the Invention

The present invention relates to elimination of noise in a video signal encoder and more particularly to a method and apparatus for eliminating noise in a video signal encoder, which computes energy of a noise component and a pure signal component and controls a variable gain over a filtering path based upon energy content of the noise component with respect to whole signal components.

2. Description of Related Art

Noise elimination performed in a conventional video signal encoder, for example, a moving picture experts group (MPEG)2 video signal encoder, depends on gain control which is represented with "1–a" as shown in FIG. 1 over a path of a signal.

FIG. 1 shows a video signal encoder employing a conventional noise elimination method. The encoder comprises: subtracter 101 for extracting an error signal from an input video signal which is processed in the unit of blocks; gain variable part 102 for performing a gain control operation of "1–a" ("a" is a gain) with respect to an output signal of the subtracter 101; gain control part 103 for controlling a gain of the gain variable part 102; discrete cosine transform (DCT)/quantization (Q) part 104 for performing DCT and quantization with respect to an output signal of the gain variable part 102; inverse quantization (IQ)/inverse DCT (IDCT) part 105 for performing inverse quantization and inverse DCT with respect to the discrete cosine transformed and quantized signal; adder 106 for summing the inverse discrete cosine transformed signal and a motion compensated signal; memory 107 for storing the summed signal; and motion estimation and compensation part 108 for performing motion estimation and motion compensation using an output signal of the memory 107 and an input video signal.

Referring to FIG. 1 having such configuration, an input signal, $g(i,j,k)$, ("i,j" is a two dimensional coordinate of a video processing unit on a frame and "k" is time domain information corresponding to the "i,j" in a time frame) is a combination of noise ($n(i,j,k)$) and pure signal ($f(i,j,k)$).

Accordingly, a pixel, $f(i-dx,j-dy,k-1)$, in a previous frame is subtracted from a current frame pixel, $g(i,j,k)$, so as to calculate a difference between the current frame pixel and the previous frame pixel. A gain value, a, is controlled based upon the difference. Noise is eliminated in such a manner of reducing the noise by increasing the gain, a, when the difference between the current frame pixel and the previous frame pixel is smaller than a predefined threshold.

Specifically, once receiving the input signal, $g(i,j,k)$, the subtracter 101 subtracts a pixel, $f(i-dx,j-dx,k-1)$, corresponding to the input signal, $g(i,j,k)$, (the pixel has been predicted by the motion estimation and compensation part 108) from the input signal, and the subtractor 101 outputs a result of the subtraction to respective the gain variable part 102 and the gain control part 103. The gain control part 103 increases or decreases the gain, a, of the gain variable part 102 according to the output of the subtractor 101, that is, the scale of the difference between the two frames, thus reducing the noise.

For example, as shown in FIG. 2, the subtracter 101 calculates a difference between an input signal and a predicted signal as follows: $d(i,j,k)=g(i,j,k)-f(i-dx,j-dx,k-1)=f(i,j,k)-f(i-dx,j-dx,k-1)+n(i,j,k)$. If the motion estimation and compensation is exact, the difference signal, $d(i,j,k)$, is mainly composed of noise, $n(i,j,k)$, so the gain control part 103 adjusts the gain, a, of the gain variable part 102 to on the order of '1', thus eliminating all of the $d(i,j,k)$. On the other hand, if the motion estimation and compensation is not exact, the $d(i,j,k)$ may be detected to be mainly composed of a signal component, $f(i,j,k)-f(i-dx,j-dx,k-1)$, so the gain control part 103 adjusts the gain, a, to on the order of '0', thus not eliminating the $d(i,j,k)$ even though it may not eliminate the noise component, $n(i,j,k)$.

In other words, as illustrated in FIG. 2, the gain control part 103 performs an absolute operation with respect to the difference signal between the input signal and the motion compensated signal, and compares an average of the result values to a reference value, thus controlling increase and decrease of the gain, a, of the gain variable part 102 according to the scale of a difference between the two values.

The gain control is performed only in an INTER mode. In an INTRA mode, the gain control process is bypassed. For this operation, a switching part which switches according to the INTER/INTRA mode is coupled to a front end of the DCT/Q part 104.

In the INTRA mode, a macroblock is encoded using only information on its own macroblock, so the motion estimation is not performed. On the other hand, in the INTER mode, the macroblock is encoded using information on another macroblock at another time as well as its own macroblock, so the motion estimation is performed.

A signal where the gain, a, has been controlled and noise has been reduced is input to the DCT/Q part 104. The signal is converted into frequency information through DCT and quantization by the DCT/Q part 104. The quantized signal is sent to output part 109 for transmission and, simultaneously, sent to the IQ/IDCT part 105. The IQ/IDCT part 105 performs dequantization and IDCT of the quantized signal and then sends a result signal to the adder 106. The adder adds the inverse discrete transformed signal to the motion compensated signal from the motion estimation and compensation part 108 so as to reconstruct an original signal. The reconstructed original signal is stored in the memory 107.

The signal stored in the memory 107 is input to the motion estimation and compensation part 108. The motion estimation and compensation part 108 performs motion estimation and compensation with respect to a current frame based upon the signal stored in the memory 107 and then sends the result to the respective subtracter 101 and adder 106.

The output part 109 performs variable length coding (VLC) and first input first output (FIFO) with respect to the noise eliminated and quantized signal and then the result signal is output in the form of a bit stream.

Such video signal encoder to which the conventional noise elimination method is applied uses a scale of the sum of the difference signals as a reference for determining how many signal components, $f(i,j,k)-f(i-dx,j-dx,k-1)$, are contained in the difference signal, $d(i,j,k)$.

Since the signal components and noise components are all together contained in the sum of the difference signals without discrimination, it cannot be identified which of the signal and noise is larger, so the system cannot properly manage the case that the noise components are much more than the signal components or the opposite case. Additionally, unnecessary filtering, such as elimination of a video signal as well as the noise, may be performed, decreasing efficiency in the noise elimination.

The conventional video signal encoder performs noise filtering in the INTER mode, so there occurs problem that the noise does not eliminated over a path where the filtering is not performed. Since the conventional video signal encoder uses only one previous pixel, the noise is not completely eliminated, and, moreover, blocking effect may increase.

FIGS. 3(a) to 3(d) illustrate the blocking effect.

Since the motion estimation and compensation is performed with respect to original image in the unit of blocks, as shown in FIG. 3(a), discontinuities 201 may occur at block boundaries in predicted image.

Since the gain control (1−a) for mc error image(the error signal is indicative of a difference between an input signal including noise and a predicted signal as shown in FIG. 3(b)), distorts block boundary of the mc error image during the noise reduction ,as shown in FIG. 3(c), discontinuities 202 occur at block boundaries between neighboring blocks in filtered image as shown in FIG. 3(d). This results to deterioration in picture quality due to the blocking effect at the block boundaries.

As illustrated, in the conventional noise elimination method and the conventional video signal encoder employing the conventional method, the noise elimination is in close relation with the operation of the motion estimation and compensation part.

Namely, to effectively eliminate the noise, displacement, (dx,dy), satisfying $f(i,j,k)=f(i-dx,j-dx,k-1)$ should be exactly found with respect to each pixel so that $g(i,j,k)-g(i-dx,j-dx,k-1)=n(i,j,k)-n(i-dx,j-dx,k-1)$ can be realized.

Since the MPEG2 video signal encoder finds the displacement, (dx,dy), in the unit of blocks, however, detection of exact displacement of each pixel cannot be guaranteed. Therefore, $g(i,j,k)-g(i-dx,j-dx,k-1)$ may include considerable amount of signal components as well as noise components and the image where the noise is filtered through the gain control of "1−a" may necessarily include discontinuities at block boundaries, thus causing blocking effect and deterioration in picture quality and reducing even pure signal.

SUMMARY OF THE INVENTION

Accordingly, the present invention is directed to a method and apparatus for eliminating noise in a video signal encoder that substantially obviates one or more of the limitations and disadvantages of the related art.

An objective of the present invention is to provide a method for eliminating noise in a video signal encoder, for dividing a video signal to be filtered into noise components and pure signal components and calculating energy of the respective noise and pure signal so as to variable-control a gain over a filtering path according to a rate of the energy of the noise and pure signal, thereby improving noise elimination performance.

Another objective of the present invention is to provide a method and apparatus for eliminating noise in a video signal encoder, for preserving as many signal components as can be judged as pure signal components in an input signal containing noise and controlling the remaining signal components of the input signal using a gain over a gain control path, thus preventing blocking effect and eliminating the noise.

Further another objective of the present invention is to provide a method and apparatus for eliminating noise in a video signal encoder, which uses a signal-adaptive weight while extracting pure signal components, thereby effectively eliminating noise even if rapid signal change occurs when considering correlation between a pixel where noise will be eliminated and its adjacent pixels.

Additional features and advantages of the invention will be set forth in the following description, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a method for eliminating noise in a video signal encoder comprises the steps of: dividing the input video signal into a noise component and a pure signal component; calculating energy of the respective noise component and pure signal component; and variable-controlling a gain over a filtering path according to a rate of the calculated energy.

The step of dividing the input video signal comprises the step of filtering a difference between the input video signal and the motion compensated signal and dividing the noise component from the pure signal component.

The step of dividing the input video signal comprises the step of calculating an average of the input video signal in the unit of blocks and dividing the noise component from the pure signal component.

The step of dividing the input video signal comprises the step of performing low pass filtering with respect to each pixel and dividing the noise component from the pure signal component.

The step of dividing the input video signal comprises the step of performing an adaptive filtering with the coefficients corresponding to local pixel-correlation from a pixel to be filtered and dividing the noise component from the pure signal component.

In another embodiment of the present invention, a method for eliminating noise in a video signal encoder comprises: the error signal extracting step of computing a difference signal between a current input video signal containing noise and a previous video signal where noise has been eliminated; the signal extracting step of extracting a pure signal component without the noise from the error signal; the noise reducing step of reducing the noise through variable gain control according to the energy-ratio between the error signal and said extracted pure signal component; and the resolution recovering step of adding the extracted signal to the noise reduced signal component so as to recover resolution which has been deteriorated during noise filtering.

In another aspect of the present invention, an apparatus for eliminating noise in a video signal encoder comprises: an error signal detecting part for computing a difference signal between a current input video signal containing noise and a previous video signal where noise has been eliminated; a signal preserving part for extracting a pure signal component without the noise from the error signal; a gain control part for calculating a gain from an energy ratio between the error signal and the extracted pure signal component; a gain variable part for eliminating the noise through variable gain control according to the gain from the gain control part; and an adder for summing the signal component where the noise has been eliminated by the gain variable means and the pure signal component extracted by the signal preserving part.

In another aspect of the present invention, a method for eliminating noise in a video signal encoder comprises the steps of: extracting a pure signal component without noise from a current input video signal containing the noise and a previous video signal where the noise has been eliminated; performing variable gain control with respect to the respective input video signal and extracted signal; and performing noise filtering using a difference value between the previous video signal and a sum of the extracted video signal and the variable gain controlled signal.

In another aspect of the present invention, an apparatus for eliminating noise in a video signal encoder comprises: an error signal detecting part for computing, as an error signal, a difference between a current input video signal containing noise and a previous video signal where the noise has been eliminated; a signal preserving part for extracting a pure signal component without noise from the error signal; a gain control part for variable-controlling a gain according to the energy-ratio calculated from the error signal and the extracted pure signal; a first gain variable part for controlling the extracted signal component of the signal preserving part according to the gain which is varied by the gain control part; a second gain variable part for controlling the input video signal component according to the gain which is varied by the gain control part; an adder for summing output values of the respective first and second gain variable part; and a subtracter for calculating a difference between an output value of the adder and the motion estimation/motion compensation part.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

Figure 4:
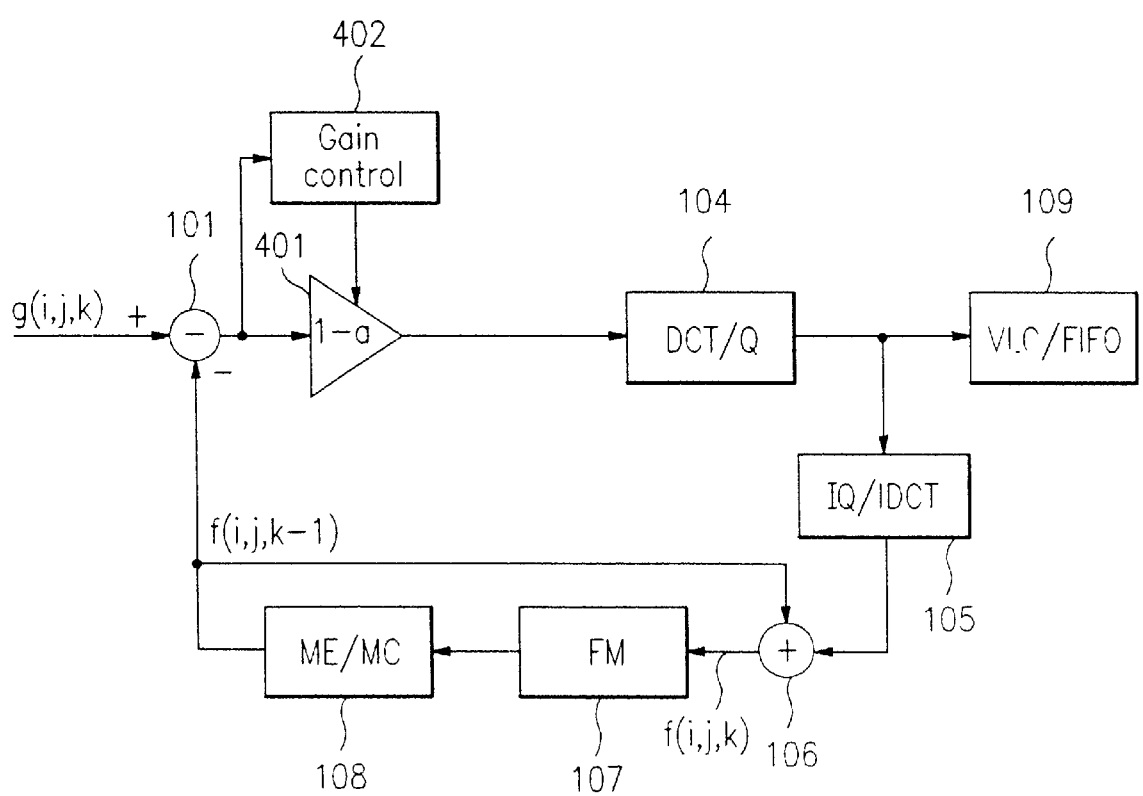
Figure 5:
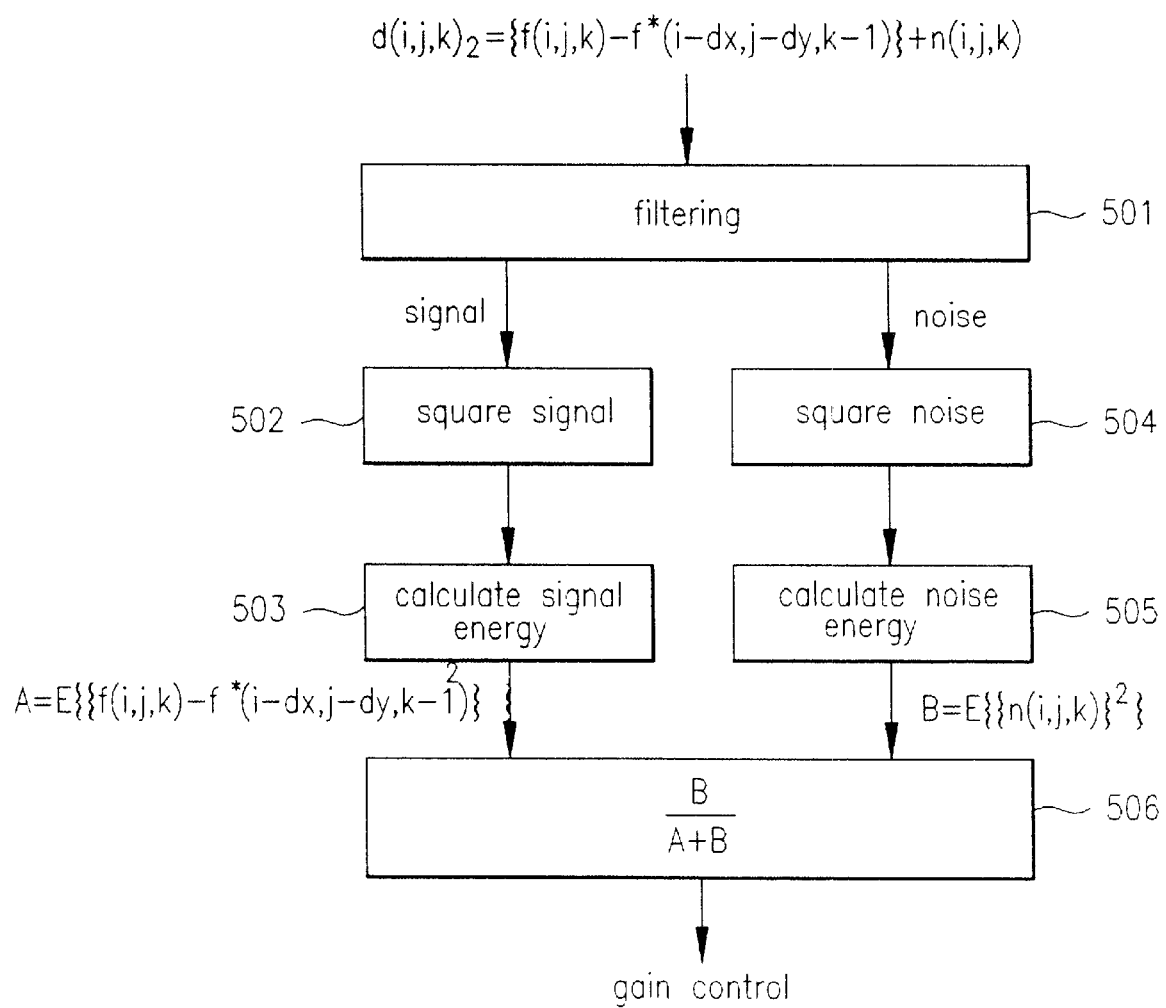
Figure 6:
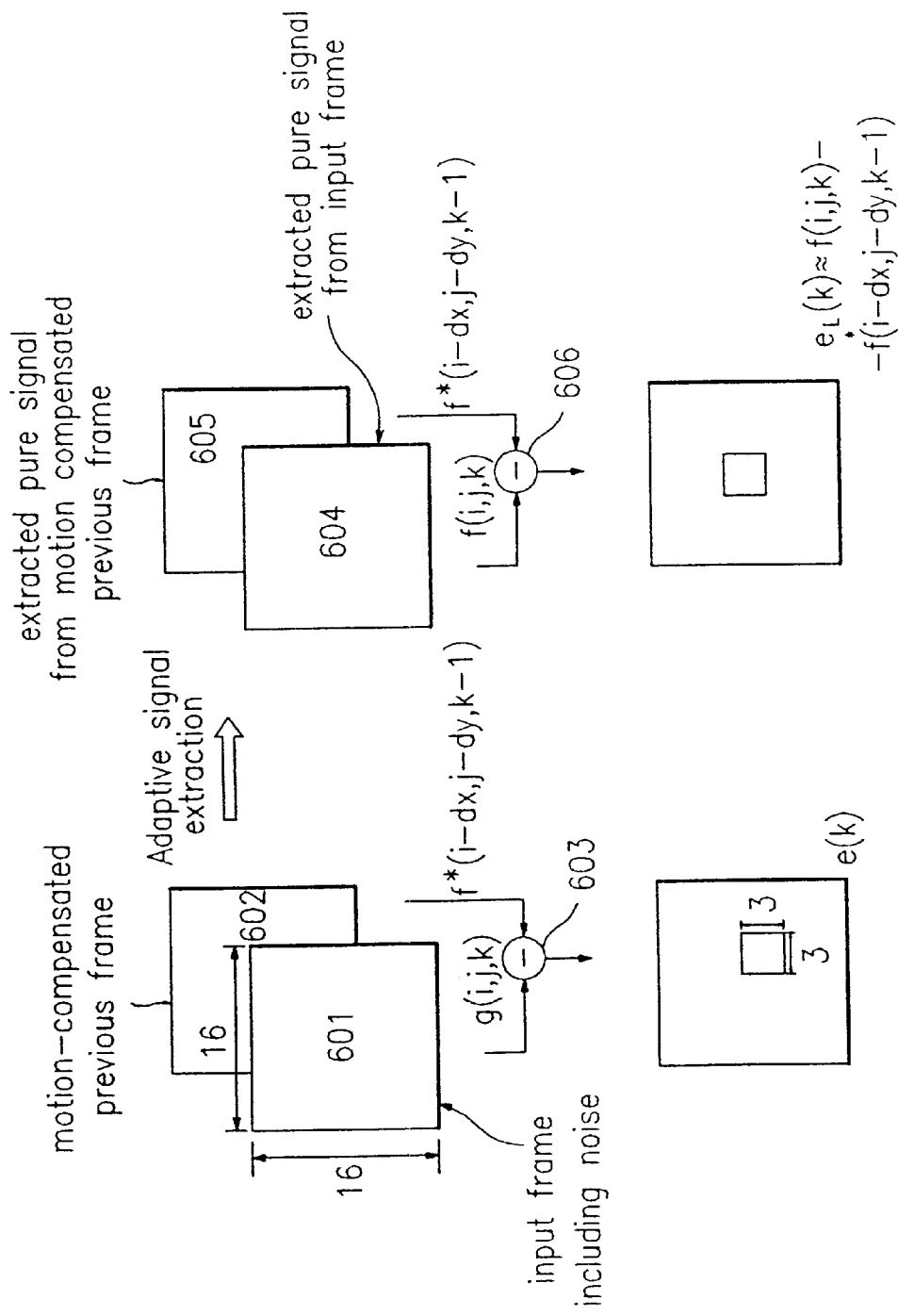
Figure 7:
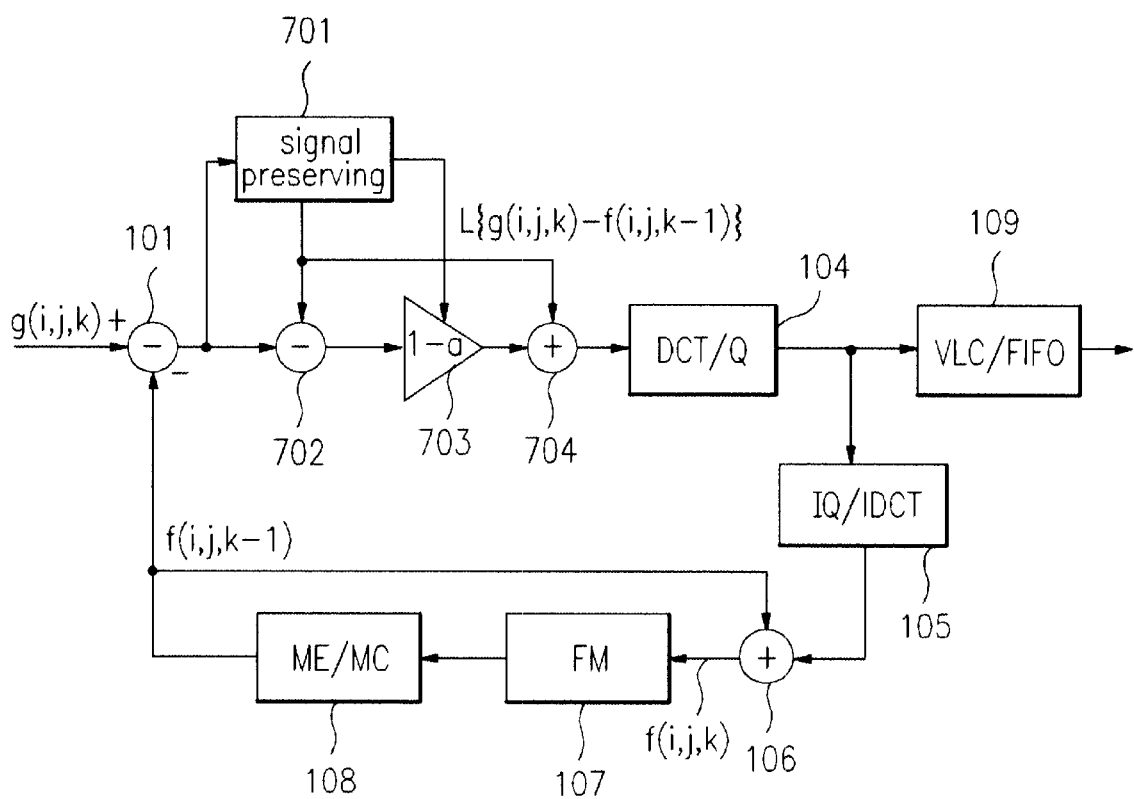
Figure 8:
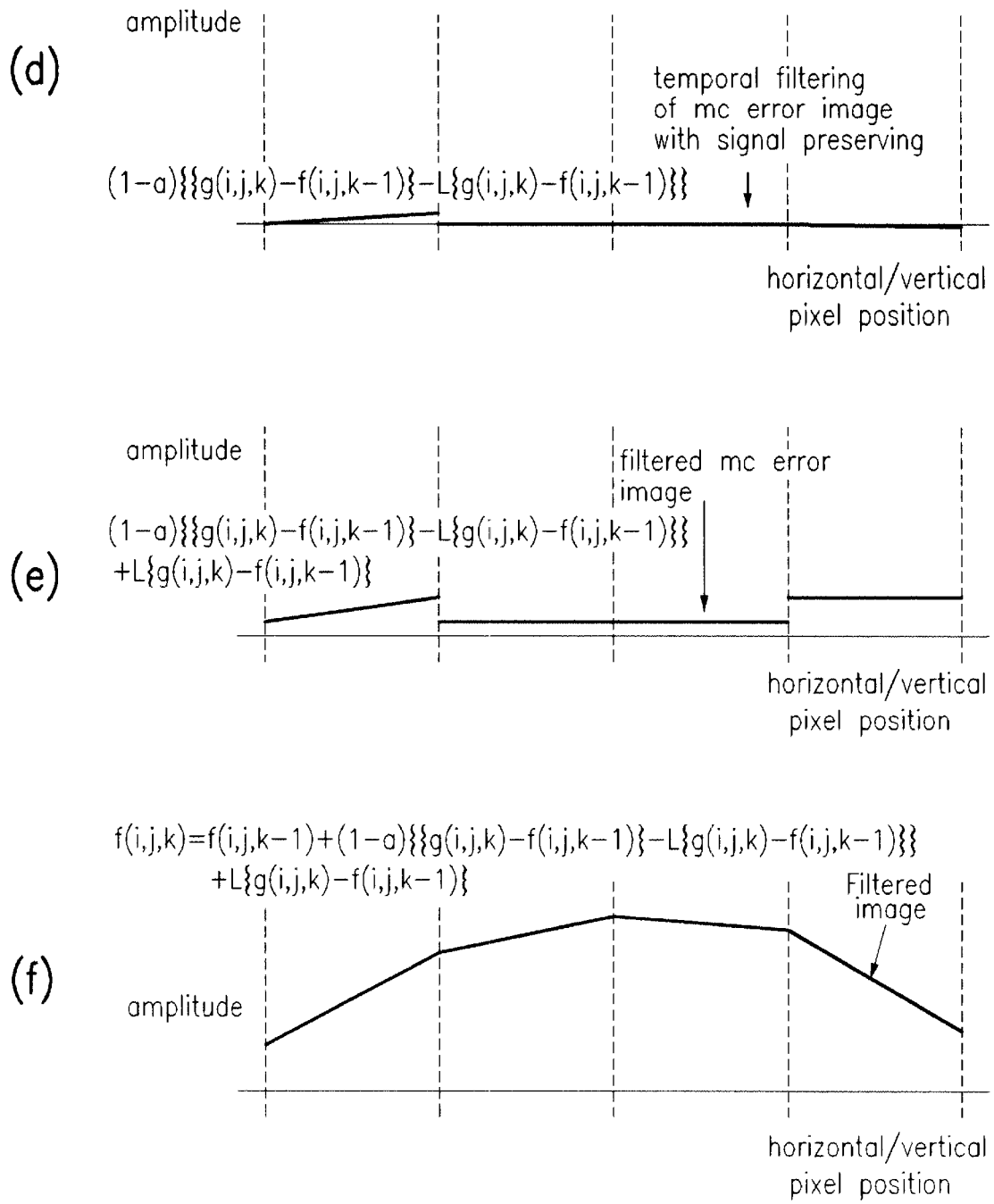
Figure 9:
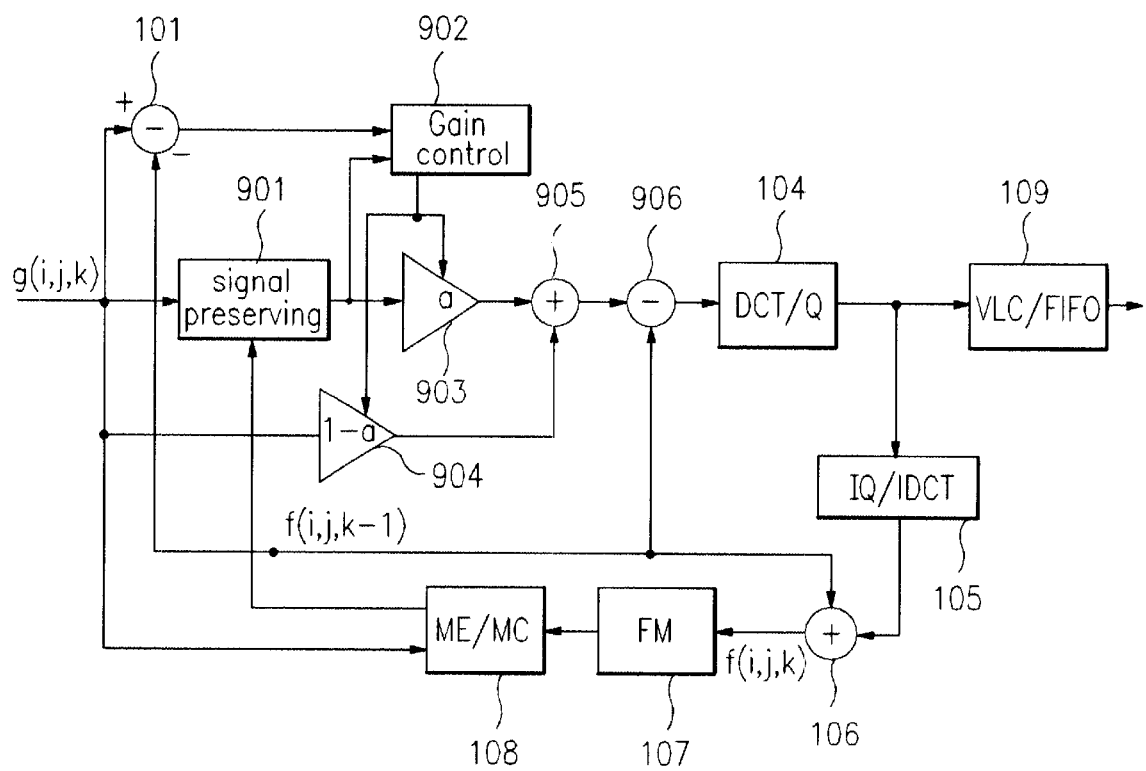

FIGS. 3(a) to 3(d) are diagrams for explaining a blocking effect according to a conventional noise elimination method;

FIG. 4 is a block diagram of a video signal encoder employing a noise elimination method according to a first embodiment of the present invention;

FIG. 5 is a diagram showing how gain is controlled according to the first embodiment of the present invention;

FIG. 6 is a diagram showing how calculation of energy depicted in FIG. 5 is performed;

FIG. 7 is a block diagram of a video signal encoder employing a noise elimination method according to a second embodiment of the present invention;

FIGS. 8(a) to 8(f) are waveform diagrams for explaining the noise elimination method depicted in FIG. 7; and FIG. 9 is a block diagram of a video signal encoder employing a noise elimination method according to a third embodiment of the present invention.

DETAILED DESCRIPTION OF PREFERRED EMBODIMENT

Reference will now be made in detail to the preferred embodiments of the present invention, examples of which are illustrated in the accompanying drawings.

With reference to the accompanying drawings, preferred embodiments of the present invention will now be described in detail.

First Embodiment

Figure 1:
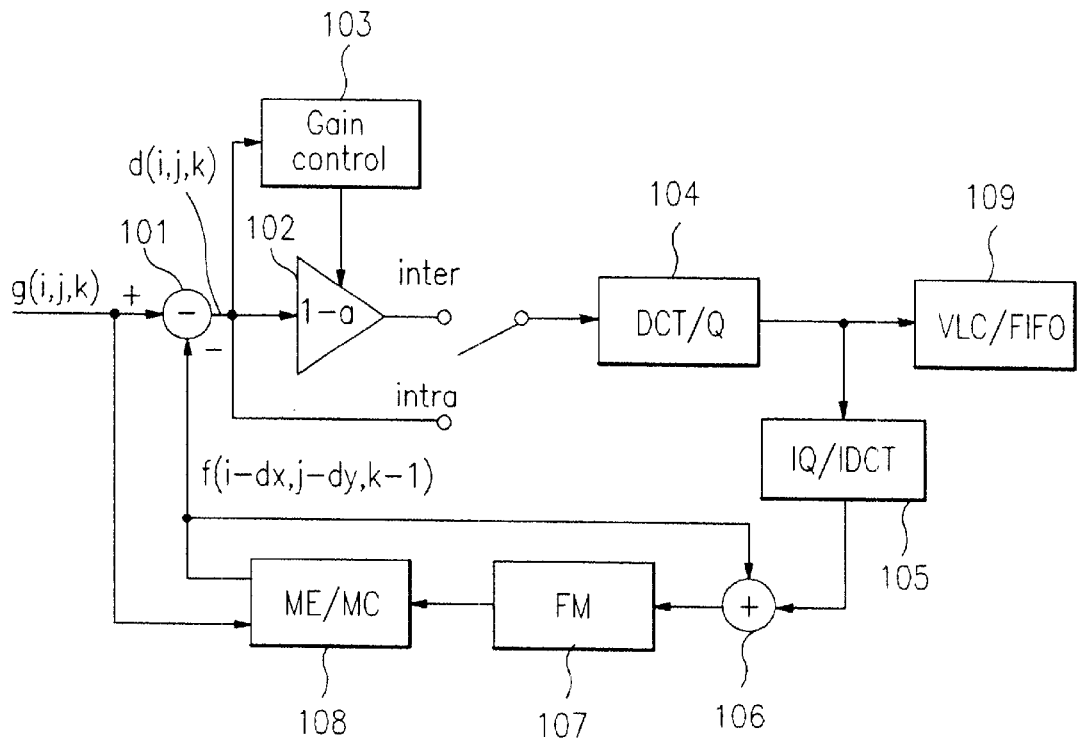
FIG. 1 is a block diagram of an MPEG2 video signal encoder to which a conventional noise elimination method is applied.
Figure 2:
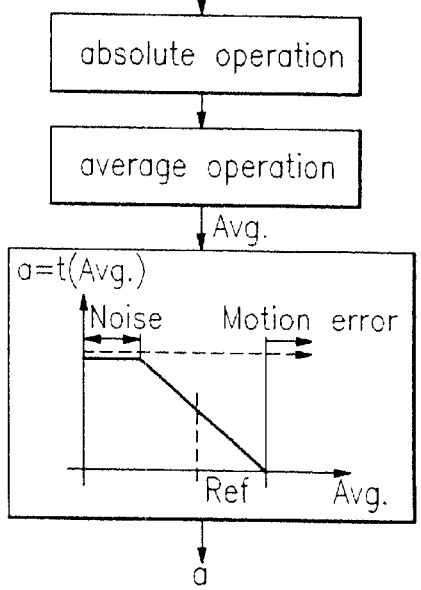
FIG. 2 is a diagram for explaining a conventional gain control method.
Figure 3:
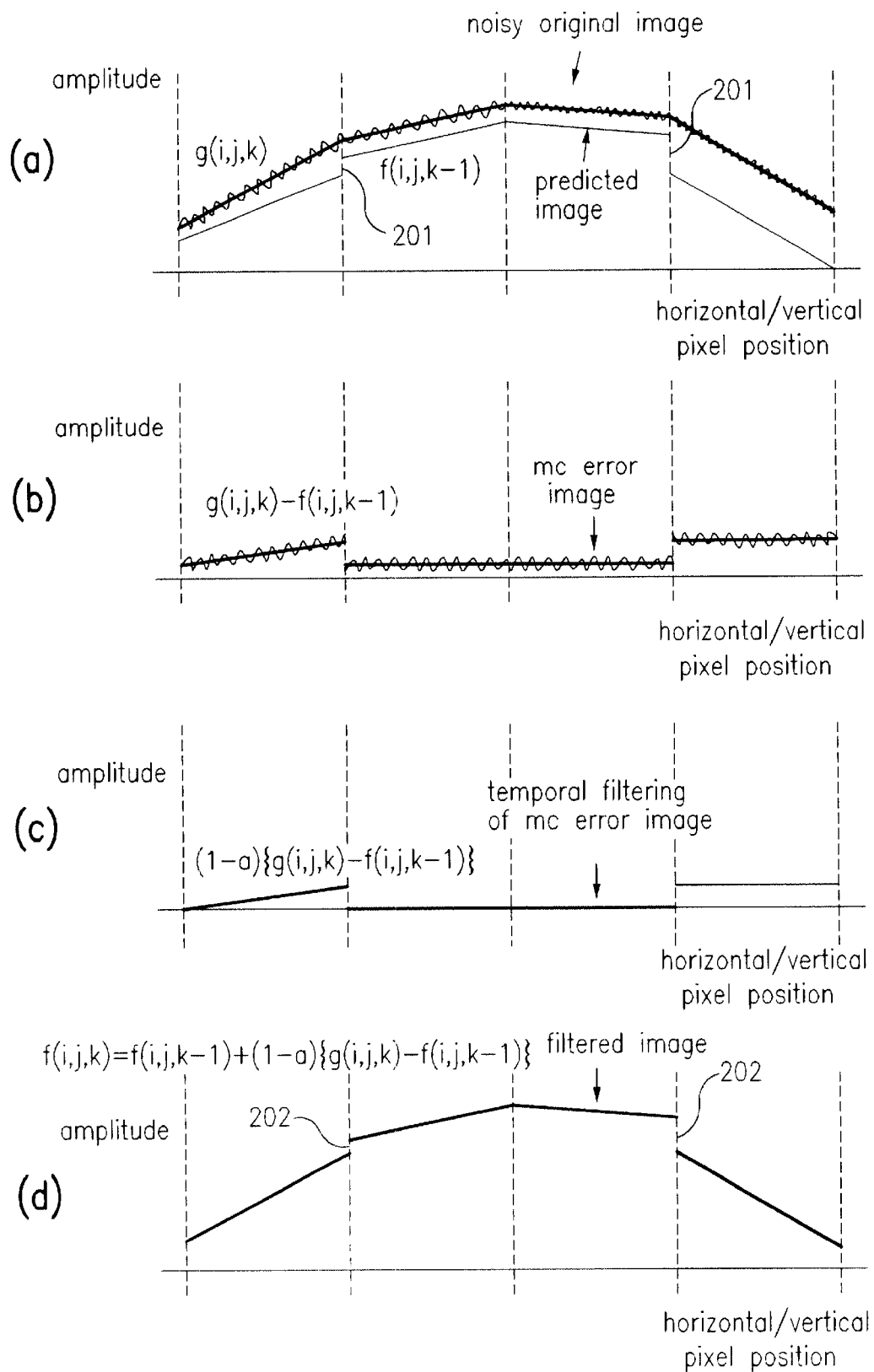

Blocks in FIG. 4 showing a first embodiment of a video signal encoder according to the present invention are the same as the blocks in FIG. 1 other than gain variable part 401 and gain control part 402, so the same reference numbers are used for the same blocks and detailed description on them will be omitted. The gain control part 402 calculates energy of noise and pure signal in an input video signal and then controls a gain, a, of the gain variable part 401 according to an energy rate.

Specifically, the gain control part 402 performs three steps of: dividing an input video signal into noise components and pure signal components; calculating energy of the respective, divided noise and pure signal; and variable-controlling a gain over a filtering path according to a rate of the calculated energy values.

Such operation for eliminating the noise according to the present invention will now be described with reference to FIGS. 4 to 6.

The subtracter 101 calculates a difference between an input signal, g(i,j,k), and a pixel, f(i−dx,j−dx,k−1), corresponding to the input signal, g(i,j,k), in a previous frame image which has already been filtered, the pixel being predicted by the motion estimation and compensation part 108, and then outputs the calculated difference to the respective gain variable part 401 and gain control part 402. The gain control part 402 increases or decreases the gain, a, of the gain variable part 401 according to the energy rate of the pure signal components and noise components in the difference signal of the subtracter 101, thus reducing the noise.

In other words, as shown in FIG. 5, the gain control part 402 receives the difference between the input signal and the predicted signal, d(i,j,k)=g(i,j,k)−f(i−dx,j−dx,k−1)=f(i,j,k)−f*(i−dx,j−dx,k−1))+n(i,j,k), from the subtracter 101 and divides the input signal into the noise and the pure signal by filtering the input signal (501). The gain control part 402 squares the divided pure signal (502), calculates the energy of the signal (503), squares the divided noise (504), and calculates the energy of the noise (505).

For example, if low pass filtering is performed at the step 501, a signal where the noise is reduced can be produced and this signal is deemed to be the pure signal.

This is shown in FIG. 6. Subtracter 603 calculates the difference signal, d(i,j,k), by subtracting motion predicted signal 602 from input video signal 601. The input video signal and motion predicted signal are low pass filtered and then low pass filtered input signal 604 and low pass filtered motion predicted signal 605 are obtained. Subtracter 606 calculates a difference between the low pass filtered input signal 604 and the low pass filtered motion predicted signal 605. A 3*3 window is then established around a pixel to be noise-filtered. The signal and the noise component is estimated from $e_L(k)$ and $e(k)−e_L(k)$, respectively.

The energy of each component is calculated within the window by using ensemble-average of $\{e_L(k)\}^2$ and $\{e(k)−e_L(k)\}^2$, respectively.

The gain control part 402 controls the gain, a, according to the rate, B/(A+B), of the respective energy, $A=E\{\{e_L(k)\}^2\}=E\{\{f(i,j,k)−f(i−dx,j−dy,k−1)\}^2\}$ and $B=E\{\{e(k)−e_L(k)\}^2\}=E\{\{n(i,j,k)\}^2\}$ (506). "A" indicates the signal component's energy and "B" indicates the noise component's energy.

As illustrated, the pure signal component and noise component relatively influence the variable gain control over the filtering path according to the energy rate of the two components. Therefore, noise filtering can be performed under optimum conditions depending upon how much noise is contained in the input video signal.

The signal where the noise is reduced through the gain control in such manner as illustrated is then input to the DCT/Q part 104. Afterwards, the same operations as those described referring to FIG. 1 are performed, so the description on succeeding operations will be omitted.

For dividing an input signal containing noise into a pure signal component and a noise component, there are other methods than to perform the low pass filtering of each pixel as illustrated above. There are a method of taking an average of the difference signal with respect to each block and a method of taking an adaptive average within the window considering pixel cerrelation of adjacent pixels with respect to each pixel.

The method of taking the average with respect to each block is realized in such a manner of accumulating differences between g(i,j,k) and f(i,j,k−1) and dividing a result value of the accumulation by a size of a block.

The method of performing the low pass filtering with respect to each pixel is realized in such a manner of performing convolution differences between each pixel of g(i,j,k) and each pixel of f(i,j,k−1) with the 3*3 low pass filter kernel.

The method of taking an adaptive average with respect to each pixel is performed in the same manner as that of the method of performing the low pass filtering with respect to each pixel except that, considering amplitude of noise and pixel correlation between adjacent pixels and a pixel to be filtered, when the pixel difference between a adjacent pixel and the corresponding center-pixel exceeds the noise-amplitude extracted from the w*w window, the corresponding filter coefficient is decreased and, when the pixel-difference is less than the noise-amplitude, the corresponding coefficient is increased during the filtering.

In the first embodiment as described above, the input video signal is divided into the noise component and the pure video signal component and gain controlled filtering is performed taking account of the energy rate of respective components, thereby performing exact filtering of an actual noise component and realizing improvement in picture quality.

Second Embodiment

As shown in FIG. 7, a second embodiment of a video signal encoder according to the present invention includes signal preserving part 701 for preserving a pure signal component other than noise in an input signal and subtracter 702, gain variable part 703, and adder 704 which compensated the blocking artifact with respect to the preserved information of the signal preserving part 701 and a filtered difference signal between the input signal and a video signal of a previous frame. The signal preserving part 701, also performs a gain control path all together. The remaining blocks in FIG. 7 are the same as the respective corresponding blocks, so the same reference numbers are used for the same blocks and the description on them will be omitted below.

In the second embodiment of the present invention having such configuration, the noise elimination is realized through a serial operational performance as shown in the following formula 1.

$$f(i,j,k)=f(i,j,k-1)+(1-a)\{\{g(i,j,k)-f(i,j,k-1)\}-L(g(i,j,k)-f(i,j,k-1))\}+L(g(i,j,k)-f(i,j,k-1))$$ [Formula 1]

As an error signal is computed a difference between an input signal, g(i,j,k), of a current frame containing noise and a predicted signal, f(i,j,k−1), of a previous frame, k−1. Components which can be estimated as a video signal are extracted from the error signal as many as possible. The gain variable part of "1−a" is performed noise filtering for a difference between the extracted signal, L(g(i,j,k)−f(i,j,k−1)), and the error signal, so that the noise is eliminated through variable gain control in accordance with the energy ratio between the extracted signal and the noise. The extracted signal component is added to the input video signal where the noise has been eliminated, thereby eliminating the noise and, simultaneously, recovering resolution which has been deteriorated during the noise filtering process.

With reference to FIG. 8, operation for eliminating the noise during video encoding according to the present invention will be described in detail below.

Primarily, the input signal, g(i,j,k), which represents original image as shown in FIG. 8(*a*), is input to the subtracter 101.

The subtracter 101 subtracts the predicted signal, f(i,j,k−1), of the motion estimation and compensation part 108 from the input signal, g(i,j,k), and produces the error signal (motion compensation error image) as shown in FIG. 8(*b*).

The signal preserving part 701 extracts maximum components which can be judged as a pure signal without noise, as a signal component, from the error signal. Here, L(g(i,j,k)−f(i,j,k−1)) corresponds to the signal component.

The method of extracting only the signal components from the input signal containing noise is represented with a function expressed as "L( )", and the method extracting the signal components are the same those of the first embodiment.

By using one of those methods, the signal component, L(g(i,j,k)−f(i,j,k−1)), as shown in FIG. 8(*c*), which has been preserved as the pure signal component is added to a signal which noise filtering operation and gain control has been performed with respect to.

In other words, the subtracter 702 calculates a difference between the error signal, g(i,j,k)−f(i,j,k−1), and the extracted pure signal component, L(g(i,j,k)−f(i,j,k−1)), and outputs the difference to the gain variable part 703. The gain variable part 703 produces a filtered signal as shown in FIG. 8(*d*) through variable control of the gain, a. The signal preserving part 701 also calculate the gain by the same manner as that of the first embodiment.

The extracted pure signal component, L(g(i,j,k)−f(i,j,k−1)), is added to the output signal of the gain variable part 703 by the adder 704, thus recovering resolution which has been deteriorated during the noise filtering.

The signal where the noise is eliminated through gain control in such manner as illustrated is then input to the DCT/Q part 104. Afterwards, the same operations as those described referring to FIG. 1 are performed, so the description on succeeding operations will be omitted.

FIG. 8(*f*) presents a finally noise filtered signal, f(i,j,k) (filtered image); illustrating decrease in signal discontinuities at block boundaries and noise.

Third Embodiment

As shown in FIG. 9, a third embodiment of a video signal encoder according to the present invention includes: signal preserving part 901 for extracting only a signal component from an input signal containing noise; first gain variable part 903 for controlling the extracted signal component with a variable gain, a; second gain variable part 904 for controlling the input video signal with a variable gain, 1−a; subtracter 101 for calculating a difference signal between the input video signal and a video signal of a previous frame; gain control part 902 for variable-controlling the gain, a, of the first and second gain variable parts 903 and 904 according to the energy-ratio(between the extracted pure signal and noise) of error signal produced from the subtracter 101; adder 905 for summing the output values of the first and second gain variable parts 903 and 904; and subtracter 906 for calculating, as an error signal, a difference between the output value of the adder 905 and the signal component of the previous frame. The remaining blocks shown in FIG. 9 are the same as the corresponding blocks shown in FIG. 1, so the same reference numbers are used for the same blocks and the description on them will be omitted.

In this third embodiment of the present invention having such configuration, the noise elimination is implemented in accordance with a serial operational performance as shown in the following formula 2.

$$f(i,j,k)=f(i,j,k-1)+(1-a)\{g(i,j,k)\}+(a)\{L(g(i,j,k)-f(i,j,k-1))\}$$ [Formula 2]

Specifically, maximum components which are judged as a pure signal are extracted from an input signal, g(i,j,k), of a current frame containing noise and a predicted signal, f(i,j,k−1), of a previous frame, k−1. Respective gain (a, 1−a) controls are then performed with respect to the extracted signal component and the input signal. Subsequently, a sum of the result values of the respective gain controls is calculated and then a difference between the sum and the predicted signal of the previous frame is calculated and produced as a signal value where noise has been filtered off.

Such operation for the noise elimination during video encoding according to the present invention starts from FIG. 7.

In the embodiment according to FIG. 7, operations for f(i,j,k)=f(i,j,k−1)+(1−a){{g(i,j,k)−f(i,j,k−1)}−L(g(i,j,k)−f(i,j,k−1))}+L(g(i,j,k)−f(i,j,k−1)) are performed. When it is counted that the predicted signal component, f(i,j,k) of the previous frame, k−1, is equal to the extracted signal component, L(f(i,j,k−1)), the embodiment shown in FIG. 9 is implemented.

Namely, through the following operations:

$$f(i, j, k) = f(i, j, k-1) + (1-a)\{\{g(i, j, k) - f(i, j, k-1)\} - L(g(i, j, k) - f(i, j, k-1))\} + L(g(i, j, k) - f(i, j, k-1))$$
$$= f(i, j, k-1) + (1-a)\{g(i, j, k) - f(i, j, k-1)\} + (a)\{L(g(i, j, k) - f(i, j, k-1))\}$$
$$= f(i, j, k-1) + (1-a)\{g(i, j, k)\} + (a)\{L(g(i, j, k) - f(i, j, k-1))\},$$

the signal preserving part 901 extracts a pure signal component, L{g(i,j,k)−f(i,j,k−1)}, from the input signal, g(i,j,k), and the predicted signal, f(i,j,k−1). The subtracter 101 computes a difference signal with respect to the current input video signal and the video signal of the previous frame and outputs the difference signal to the gain control part 902.

The gain control part 902 controls the gain, a, of the first and second gain variable parts 903 and 904. The first gain variable part 903 multiplies a value of the extracted pure signal component by the gain, a. The second gain variable part 904 multiplies a value of the input signal by the gain, 1−a. The adder 905 sums the output values of the first and second gain variable parts 903 and 904 and outputs a result of the summation to the subtracter 906. The subtracter 906 calculates a difference between the result of the summation and the predicted signal of the previous frame, thus implementing the noise filtering.

Afterwards, the quantization, inverse quantization, memory, motion estimation and compensation, and conversion into a bit stream are performed in the same manner as that in FIG. 1, so the detailed description on them will be omitted.

The second and third embodiments according to the present invention are different from each other in the following aspects.

In an aspect of pixels to be filtered, the third embodiment as shown in FIG. 9 can perform the filtering by considering pixels in the input frame along with the difference signal while the second embodiment as shown in FIG. 7 considers only the difference signal.

Since data at a filter supporting area in a noise filter can be used in a more generalized manner in a video signal encoder according to the third embodiment as shown in FIG. 9, the third embodiment may more effectively eliminate noise than the second embodiment.

Therefore, the third embodiment is more appropriate for the case where noise contained in an input image is great. On the other hand, the second embodiment has advantage in aspect of the volume of calculation, so it is proper to the case where the noise is small.

The method of extracting a signal component according to the third embodiment shown in FIG. 9 is the same as that of the second embodiment shown in FIG. 7.

As illustrated above, the method and apparatus for eliminating noise in a video signal encoder according to the present invention divides an input video signal into a noise component and a pure video signal component and performs filtering gain control taking account of a rate of energy of the noise and pure signal, thereby performing the exact filtering with respect to an actual noise component and improving picture quality. The present invention also extracts a noise filtered signal component in advance, performs filtering of the remaining signal through gain control, and combines the extracted pure signal component and the filtered remaining signal, thereby eliminating the noise while keeping the resolution of the signal. Additionally, if the video signal is processed in the unit of blocks, the noise filtering is performed considering this fact, thereby reducing blocking effect and improving picture quality.

It will be apparent to those skilled in the art that various modifications and variations can be made in a method and apparatus for eliminating noise in a video signal encoder of the present invention without deviating from the spirit or scope of the invention. Thus, it is intended that the present invention covers the modifications and variations of this invention provided they come within the scope of the appended claims and their equivalents.

What is claimed is:

1. A method for eliminating noise in a video signal encoder which calculates a difference between an input video signal and a motion compensated video signal of a previous frame to perform encoding, comprising:

splitting the input video signal into a noise component and a pure signal component;

calculating an energy of the respective noise component and pure signal component; and variable-controlling a gain over a filtering path according to a ratio of the calculated energy of each of the noise component and the pure signal component.

2. The method of claim 1, wherein splitting the input video signal comprises filtering a difference between the input video signal and the motion compensated signal, and dividing the noise component from the pure signal component.

3. The method of claim 1, wherein splitting the input video signal comprises calculating an average of the input video signal in block units, and dividing the noise component from the pure signal component.

4. The method of claim 1, wherein splitting the input video signal comprises performing low pass filtering with respect to each pixel and dividing the noise component from the pure signal component.

5. The method of claim 1, wherein splitting the input video signal comprises performing an adaptive filtering with coefficients corresponding to local pixel-correlation from a pixel to be filtered and dividing the noise component from the pure signal component.

6. The method of claim 1, wherein calculating the energy comprises squaring the pure signal component to calculate an energy of the pure signal component and squaring the noise component to calculate the energy of the noise component.

7. The method of claim 3, wherein calculating the average of the input video signal in block units comprises accumulating differences between the input signal and the motion compensated signal and dividing a result value of the accumulation by a size of a block.

8. A method for eliminating noise in a video signal encoder which calculates a difference between an input video signal and a motion compensated video signal of a previous frame to perform encoding, comprising:

an error signal extracting step of computing a difference signal between a current input video signal containing noise and a previous video signal where noise has been eliminated;

a signal extracting step of extracting a pure signal component without the noise from said error signal;

a noise reducing step of reducing the noise through variable gain control according to energy-ratio between said error signal and said extracted pure signal component; and a resolution recovering step of adding said extracted signal to the noise reduced signal component so as to eliminate the noise and recover resolution which has been deteriorated during noise filtering.

9. The method of claim 8, wherein said signal extracting step comprises computing an average of the input video signal in block units.

10. The method of claim 8, wherein said signal extracting step comprises performing low pass filtering with respect to each pixel.

11. The method of claim 9, wherein calculating the average of the input video signal in block units comprises accumulating differences between the input signal and the motion compensated signal and dividing a result value of the accumulation by a size of a block.

12. An apparatus for eliminating noise in a video signal encoder which calculates a difference between an input video signal and a motion compensated video signal of a previous frame to perform encoding, comprising:

error signal detecting means for computing a difference signal between a current input video signal containing noise and a previous video signal where noise has been eliminated;

signal preserving means for extracting a pure signal component without the noise from said error signal;

operating means for calculating a gain from an energy-ratio between said error signal and said extracted pure signal component;

gain variable means for eliminating the noise through variable gain control according to the gain from said operating means; and adding means for summing the signal component where the noise has been eliminated by said gain variable means and said pure signal component extracted by said signal preserving means.

13. A method for eliminating noise in a video signal encoder which calculates a difference between an input video signal and a motion compensated video signal of a previous frame to perform encoding, comprising:

extracting a pure signal component without noise from a current input video signal containing the noise and a previous video signal where the noise has been eliminated;

performing variable gain control with respect to the respective input video signal and extracted signal; and performing noise filtering using a difference value between the previous video signal and a sum of the extracted video signal and the variable gain controlled signal.

14. The method of claim 13, wherein a difference signal between the input video signal and the video signal of the previous frame is calculated and then said variable gain control is performed according to a level of said difference signal.

15. An apparatus for eliminating noise in a video signal encoder which calculates a difference between an input video signal and a motion compensated video signal of a previous frame to perform encoding, comprising:

error signal detecting means for computing, as an error signal, a difference between a current input video signal containing noise and a previous video signal where the noise has been eliminated;

signal preserving means for extracting a pure signal component without noise from said error signal;

gain control means for variable-controlling a gain according to said error signal;

first gain variable means for controlling the extracted signal component of said signal preserving means according to the gain which is varied by said gain control means;

second gain variable means for controlling the input video signal component according to the gain which is varied by said gain control means;

adding means for summing output values of said respective first and second gain variable means; and subtracting means for calculating a difference between an output value of said adding means and the error signal of said error signal detecting means.

16. An apparatus for eliminating noise in a video signal encoder, comprising:

an error signal detector to compute a difference signal between a current input video signal containing noise and a previous video signal where noise has been eliminated;

a signal extractor to extract a pure signal component without the noise from the difference signal;

an energy calculator to calculate a gain from an energy-ratio between the difference signal and the extracted pure signal component;

a variable gain controller to eliminate the noise through variable gain control according to the gain from the energy calculator; and an adder to sum the signal component where the noise has been eliminated by the variable gain controller and the pure signal component extracted by the signal extractor.

17. The apparatus of claim 16, wherein the previous video signal comprises a motion compensated video signal of a previous frame.

18. The apparatus of claim 16, further comprising a discrete cosine transformer/quantizer coupled to receive an output of the adder to convert it into frequency information, and a variable length coder coupled to receive an output of the discrete cosine transformer/quantizer to generate an encoded video signal.

19. The apparatus of claim 16, wherein the previous video signal is provided by a motion estimator/motion compensator, and wherein the motion estimator/motion compensator is coupled to receive only an output of the adder.

20. The apparatus of claim 16, wherein the error calculator calculates a quotient of noise energy divided by a sum of noise energy and signal energy, and provides the quotient to the variable gain controller to control the gain.

21. An apparatus for eliminating noise in a video signal encoder, comprising:

an error signal detector to calculate an error signal, the error signal being a difference between a current input video signal containing noise and a previous video signal where the noise has been eliminated;

a signal extractor to extract a pure signal component without noise from the error signal;

a gain controller to variably control a gain according to the error signal;

a first variable gain controller to control the extracted signal component of the signal extractor according to the gain which is varied by the gain controller;

a variable gain controller to control the input video signal component according to the gain which is varied by the gain controller;

an adder to sum output values of the first and second variable gain controllers; and a subtractor to calculate a difference between an output value of the adder and the error signal.

22. The apparatus of claim 21, wherein the previous video signal comprises a motion compensated video signal of a previous frame.

23. The apparatus of claim 21, further comprising a discrete cosine transformer/quantizer coupled to receive an output of the subtractor to convert it into frequency information, and a variable length coder coupled to receive an output of the discrete cosine transformer/quantizer to generate an encoded video signal.

* * * * *